United States Patent

Hirata et al.

[11] Patent Number: 5,677,954
[45] Date of Patent: Oct. 14, 1997

[54] CRYPTICAL CONTROL METHOD FOR PERSONAL COMMUNICATION

[75] Inventors: Shoichi Hirata, Higashiyamato; Yasuyuki Uchiyama, Chofu; Hiroshi Tsukahara, Tokorozawa; Masami Yabusaki, Iruma, all of Japan

[73] Assignee: NTT Mobile Communications Network, Inc., Tokyo, Japan

[21] Appl. No.: 367,297

[22] PCT Filed: Jul. 6, 1994

[86] PCT No.: PCT/JP94/01097

§ 371 Date: Jan. 12, 1995

§ 102(e) Date: Jan. 12, 1995

[30] Foreign Application Priority Data

Jul. 7, 1993 [JP] Japan .................... 5-167703

[51] Int. Cl.$^6$ .................................................. H04L 9/00
[52] U.S. Cl. ................................................ 380/21; 380/49
[58] Field of Search ................................ 380/21, 48, 49

[56] References Cited

U.S. PATENT DOCUMENTS

| | | | |
|---|---|---|---|
| 5,202,921 | 4/1993 | Herzberg et al. | 380/21 |
| 5,227,613 | 7/1993 | Takagi et al. | 380/21 |
| 5,325,433 | 6/1994 | Torii et al. | 380/21 |
| 5,381,481 | 1/1995 | Gammie et al. | 380/21 |
| 5,434,918 | 7/1995 | Kung et al. | 380/21 |
| 5,481,609 | 1/1996 | Cohen et al. | 380/21 |
| 5,544,245 | 8/1996 | Tsubakiyama | 380/21 |
| 5,552,897 | 9/1996 | Mandelbaum et al. | 380/21 |

FOREIGN PATENT DOCUMENTS

0 502 441  9/1992  European Pat. Off. .

Primary Examiner—David C. Cain
Attorney, Agent, or Firm—Pollock, Vande Sande & Priddy

[57] ABSTRACT

When an incoming call corresponding to a communication number PID takes place in a switching station, the switching station retrieves user-intrinsic information UK and an incoming-communication registered terminal identification number SID and sends the communication number PID to a communication terminal. When the communication terminal replies, the switching station generates a random number R and sends it to the communication terminal. In addition, the switching station generates a cryptical key K=F (R, UK) corresponding to the user-intrinsic information UK and the random number R. The communication terminal generates a cryptical key K=F (R, UK) corresponding to the received random number R and the user-intrinsic information UK that is input by the user. The switching station and the communication terminal encrypt the communication information corresponding to the cryptical key K and decrypt received encrypted communication information.

9 Claims, 5 Drawing Sheets

| PID | UK | SID | KS |
|---|---|---|---|
| $PID_1$ | $UK_1$ | $SID_1$ | B |
| $PID_2$ | $UK_2$ | $SID_1$ | A |
| ⋮ | ⋮ | ⋮ | ⋮ |

FIG.5

CRYPTICAL CONTROL METHOD FOR PERSONAL COMMUNICATION

TECHNICAL FIELD

The present invention relates to a personal communication system for allowing a user to send and receive information with a user-intrinsic communication number at any communication terminal, and more particularly relates to a cryptical control method for encrypting communication information transmitted between the communication terminal and a switching station corresponding to a cryptical key.

RELATED ART

In a mobile communication system, communication information is easily received by a third party especially in a radio communication region. From this point of view, it has been proposed to encrypt communication information transmitted between a communication terminal (mobile radio terminal) and a switching station (connected to the mobile radio terminal through a base station) corresponding to a cryptical key. In other words, the communication terminal and the switching station that send and receive communication information to and from each other generate respective cryptical keys corresponding to communication-terminal-intrinsic information and encrypt the communication information transmitted therebetween corresponding to the cryptical keys.

In a personal communication, each user (subscriber) is assigned a user-intrinsic communication number (PID). The user uses the communication number to use a service. The user is charged for the use of the communication number. In the personal communication, the use can register a desired communication terminal corresponding to the user-intrinsic communication number so that he (she) can receive incoming communication at a his (her) convenient place. Every communication terminal has an intrinsic terminal identification number (SID). A database connected to the switching station records user communication numbers (PID) and the communication terminal identification number (SID) registered as receiving communication terminals. In the service network, conventional communication terminals that do not accord with the personal communication system are present. The conventional communication terminals are assigned communication numbers that are charged (namely, conventional telephone numbers) (PID). When a user initiates an outgoing communication, he or she should designate a communication number (PID) of a receiving user regardless of whether or not the receiving user is a subscriber of the personal communication. The switching station references the database and reads an identification number (SID) of a communication terminal corresponding to the designated communication number (PID), and connects the call to the communication terminal with the identification number. In the personal communication system, when two or more users register one communication terminal as their receiving terminals, they can share the communication terminal using their communication numbers (PID).

Now assume that a conventional cryptical control method is applied for the personal communication system so that a plurality of users can use the same communication terminal. In this case, when a cryptical key is generated to encrypt communication information transmitted between each user and the switching station, communication-terminal-intrinsic information is shared by the users. In other words, conventionally, communication-terminal-intrinsic information is provided as key generating information in secret. A cryptical key is generated corresponding to both a random number that is received from the switching station for each communication line and the terminal-intrinsic information. Corresponding to the cryptical key, communication information is encrypted. Thus, any user of the same communication terminal uses the same terminal-intrinsic information to generate a cryptical key that is used to encrypt the communication information. Thus, the cryptical reliability of communication information is deteriorated.

An object of the present invention is to provide a cryptical control method for personal communication that improves the cryptical reliability of communication information transmitted between a communication terminal and a switching station.

SUMMARY OF THE INVENTION

According to a first aspect of the present invention, a switching station retrieves user-intrinsic information UK of a received communication number from a database and generates a cryptical key K=F (R, UK) corresponding to the intrinsic information UK and a random number R. A communication terminal generates a cryptical key K=(R, UK) corresponding to a user-intrinsic information UK that is inputted by a user and a random number R that is received from the switching station.

According to a second aspect of the present invention, a switching station retrieves user-intrinsic information UK corresponding to a communication number that is received and a communication-terminal-intrinsic information TK that is used by the user from a database and generates a cryptical key K=F (R, UK, TK) corresponding to the intrinsic information UK and TK and a random number R. A communication terminal generates a cryptical key K=F (R, UK, TK) corresponding to intrinsic information UK that is inputted by the user, communication-terminal-intrinsic information TK, and a random number R that is received from the switching station.

According to a third aspect of the present invention, key selection information that represents the selection of one of a plurality of methods for generating a cryptical key K corresponding to either or both user-intrinsic information UK and terminal-intrinsic information TK plus a random number R has been registered in a database corresponding to communication numbers PID. A switching station generates a cryptical key corresponding to the key selection information KS and sends the key selection information KS and the random number R to a communication terminal. The communication terminal generates a cryptical key corresponding to one of the methods that accords with the key selection information KS that is received from the switching station.

Thus, according to the present invention, when the same communication terminal is used by a plurality of users, since a cryptical key is not generated corresponding to the same terminal-intrinsic information, the cryptical reliability of communication transmitted between the switching station and the communication terminal can be improved.

BEST MODES FOR CARRYING OUT THE INVENTION

Figure 1:
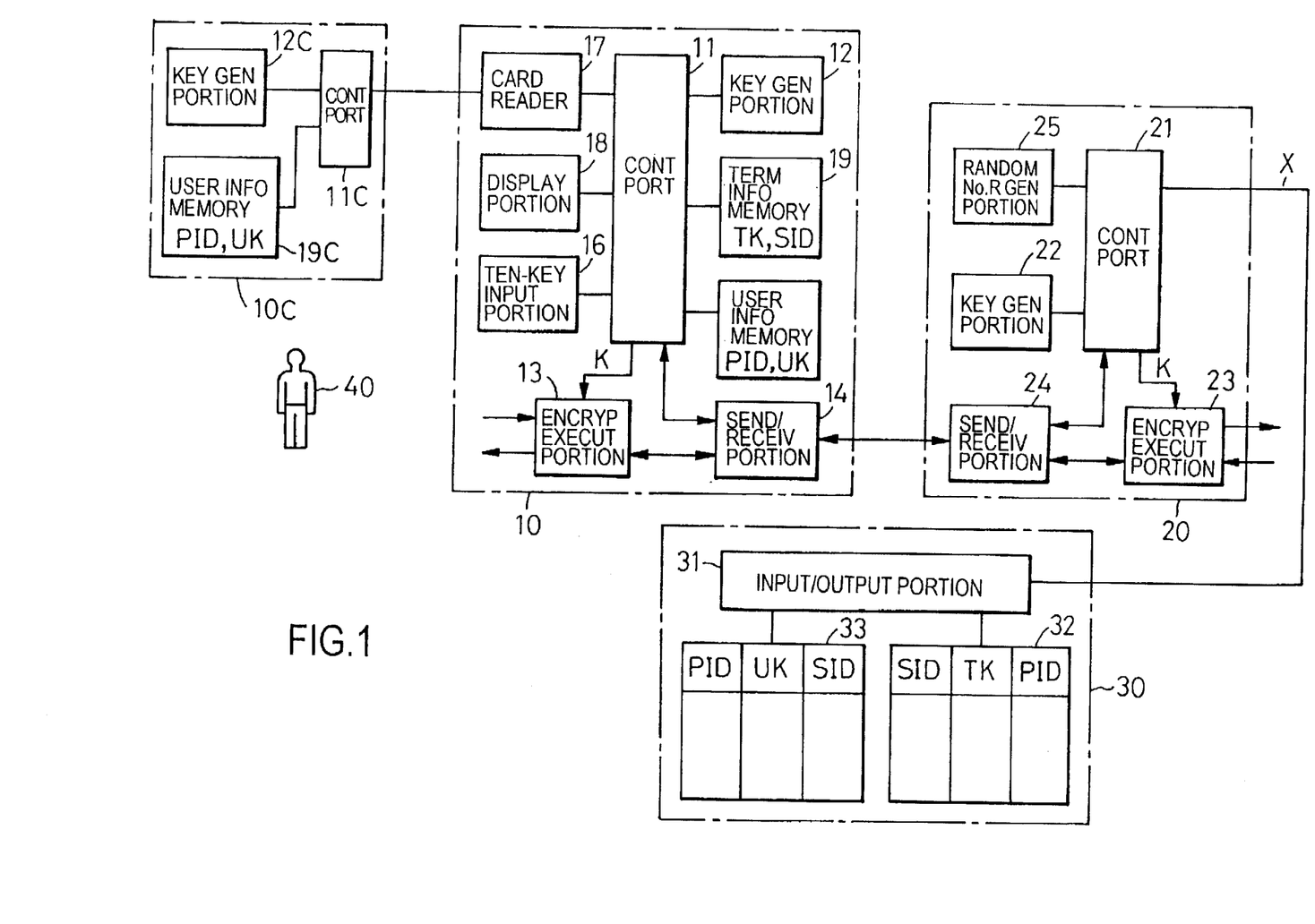
FIG. 1 is a block diagram showing a part of a personal communication system according to the present invention.

FIG. 1 is a block diagram showing a part of a personal communication system according to the first, second, and third aspects of the present invention. Referring to FIG. 1, a communication terminal 10 is generally a mobile radio terminal. The communication terminal 10 is connected to a switching station 20 through a base station (not shown) with a control line and a communication line. The communication terminal 10 and the switching station 20 comprise control portions 11, 21, key generating portions 12, 22, encryption portions 13, 23, and signal sending/receiving portions 14, 24, respectively. The encryption executing portions 13 and 23 encrypt communication information to be transmitted and decrypt encrypted communication information that is received corresponding to cryptical keys. The communication terminal 10 further comprises a terminal-intrinsic information memory 15, a ten-key portion 16, a card reader 17, a display portion 18, and a user information memory 19. The terminal-intrinsic information memory 15 stores communication-terminal-intrinsic information TK. The ten-key portion 16 is used to input a destination communication number PIDd, a user communication number PID, and intrinsic information UK. When necessary, the card reader 17 is used to input a user communication number PID and user-intrinsic information UK through for example a magnetic card or an IC card. The display portion 18 displays a communication number of a receiving user, a user name, and input information of outgoing communication. When a user registers an incoming communication, the user information memory 19 stores a user communication number PID and user-intrinsic information UK. When a user of the communication terminal has been registered, the user communication number PID and the user-intrinsic information UK are stored in the user information memory 19.

The IC card 10C comprises a control portion 11C, a key generating portion 12C, and a user information memory 19C. The IC card 10C reads the user communication number PID and the user-intrinsic information UK from the memory 19C corresponding to a request from the communication terminal 10 and sends them to the communication terminal 10. Alternatively, the key generating portion 12C performs a predetermined operation K=F (R, UK) corresponding to a random number R received from the terminal 10 and the user-intrinsic information UK that is read from the memory 19C and sends the key K to the terminal 10. The switching station 20 is connected to an input/output portion 31 of a database 30 through a control line X. The database 30 comprises a terminal data memory 32 and a subscriber data memory 33 that are connected to the input/output portion 31. The terminal data memory 32 stores intrinsic information TK corresponding to an identification number SID of each communication terminal. The subscriber data memory 33 stores user-intrinsic information UK and an identification number SID. The user-intrinsic information UK is a specific information corresponding to each communication number PID. The identification number SID is registered as a receiving terminal of the user or stored as a predetermined terminal identification number.

The key generating method performed in the key generating portions 12, 12C, 22 is one of conventional methods. However, the key generating method has been predetermined. The operation performed by the key generating portions 12, 12C, and 22 is denoted by F. In addition, the encryption and decryption of information performed by the encryption executing portions 13 and 23 corresponding to the key K may be performed by a conventional technique.

According to the first aspect of the present invention, a cryptical key K is generated for communication information transmitted between the communication terminal 10 and the switching station 20 through a base station (not shown) corresponding to user-intrinsic information that is information UK corresponding to a communication number PID of a user instead of communication-terminal-intrinsic information. The communication information is encrypted corresponding to the cryptical key. Next, with reference to FIG. 2, a cryptical control sequence of an incoming communication will be described.

As with the above-described embodiment, in the embodiments according to other aspects, it is assumed that when a user 40 uses a communication terminal 10, he (she) uses an IC card 10C.

Figure 2:
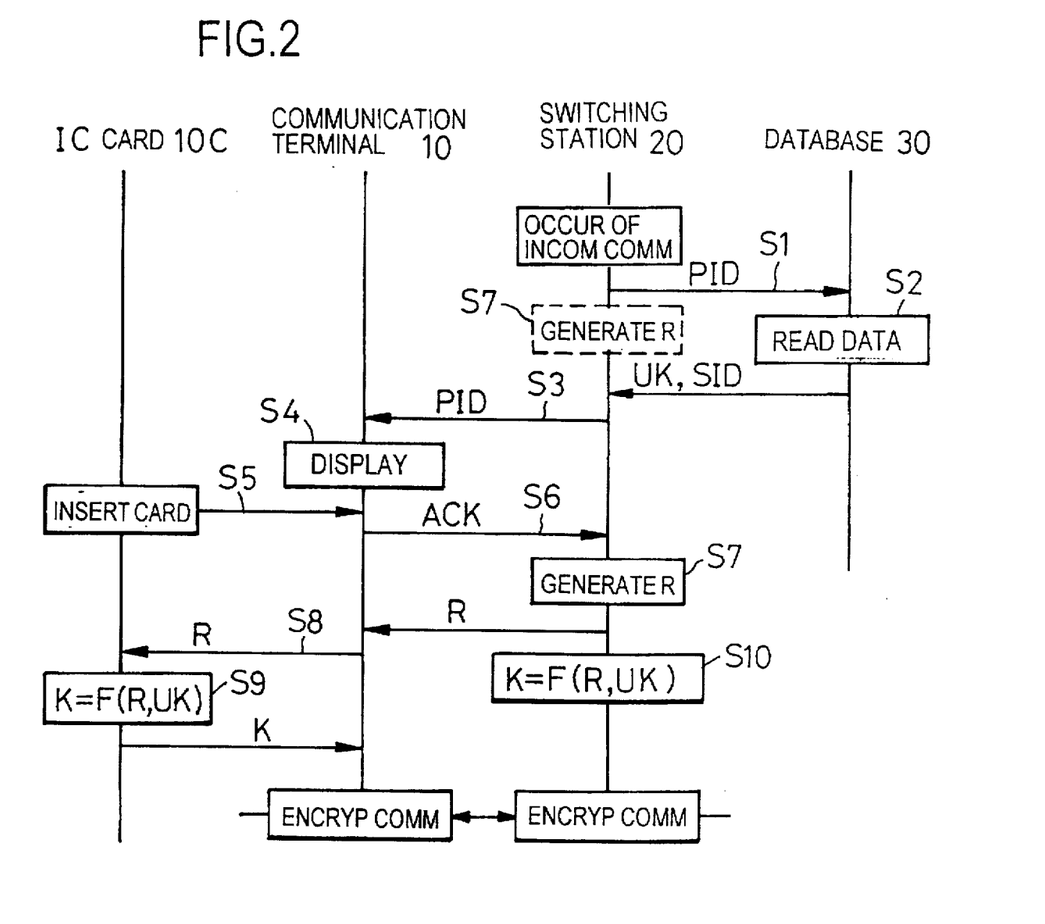
FIG. 2 is a schematic diagram showing a cryptical control sequence of an incoming communication according to the first aspect of the present invention.

When an incoming communication corresponding to a communication number PID takes place in the switching station 20, at step S1, the control portion 21 sends the communication number PID to the database 30 and requests subscriber information therefrom. At step S2, the database 30 reads intrinsic information UK and an incoming-communication registered terminal identification number SID stored in the subscriber data memory 33 corresponding to the communication number PID and sends them to the switching station 20. At step S3, the control portion 21 sends the communication number PID to the terminal 10 corresponding to the identification number SID through the sending/receiving portion 24. At step S4, the control portion 11 of the communication terminal 10 displays the received PID or the corresponding user name on the display portion 18. Alternatively, the control portion 11 activates a signal sound generating means (not shown) so as to inform the user of the incoming communication. At step S5, the user 40 designated by the PID displayed or the user name inserts his (her) IC card 10C into a card reader 17 of the terminal 10. Thus, at step S6, the control portion 11 of the communication terminal sends an acknowledge signal ACK to the switching station 20.

When the sending/receiving portion 24 receives the ACK signal, at step 7, a random number generating portion 25 generates a random number R and sends it to the communication terminal 10. At step S8, the control portion 11 of the terminal 10 sends the received random number R to the IC card 10C and requests an cryptical key therefrom. At step S9, the control portion 11C of the IC card 10C reads the user-intrinsic information UK from the memory 19C, causes the key generating portion 12C to perform an operation "cryptical key K=F (R, UK)" corresponding to the random number R and the intrinsic information UK, and sends the result to the terminal control portion 11. At step S10, the control portion 11C causes the key generating portion 22 to perform an operation "cryptical key K=F (R, UK)" corresponding to the generated random number R and the received intrinsic information UK. Thereafter, the encryption executing portion 23 of the switching station 20 encrypts the received communication information corresponding to the cryptical key K and the sending/receiving portion 24 sends the encrypted communication information to the terminal 10. In addition, the encryption executing portion 23 decrypts the encrypted communication information corresponding to the cryptical key K and sends the decrypted communication information to the originating party. On the other hand, the encryption executing portion 13 of the terminal 10 decrypts the encrypted communication information received from the switching station 20 and outputs the decrypted communication information. In addition, the encryption executing portion 13 of the terminal 10 decrypts the communication information of the user 40 corresponding to the cryptical key K and sends the encrypted communication information to the switching station 20 through the sending/receiving portion 14.

Since the communication information encrypted corresponding to the user-intrinsic information UK is transmitted between the terminal 10 and the switching station, the intrinsic information UK used for generating the cryptical key depends on the user 40 of the communication terminal 10. Thus, the cryptical reliability of communication information can be improved over the case where the key is generated corresponding to the same terminal-intrinsic information TK. In FIG. 2, since the cryptical key corresponding to the user-intrinsic information UK is generated by the IC card 10. the key generating portion 12 of the communication terminal 10 is not required. However, in the case that the user 40 does not use the IC card 10C, when he (she) registers a receiving terminal to the data base 30, he (she) will input his (her) communication number PID and the intrinsic information UK through the ten-key input portion 16 so as to store them in the user information memory 19. After the random number R is received, the key generating portion 12 can read the user-intrinsic information UK from the memory 19 and perform the operation "cryptical key K=F (R, UK)" (at step S9). Alternatively, instead of inputting the intrinsic information UK through the ten-key input portion 16, a magnetic card that stores the intrinsic information UK may be inserted into the card reader 17 so as to read the intrinsic information UK.

In this embodiment, after the switching station 20 receives the acknowledge signal ACK from the communication terminal 10, the switching station 20 generates the random number R at step S7. However, as shown by a box S7 (dashed line) in FIG. 2, after the incoming call is received, until the communication number PID is transmitted at step S3, at any timing, the random number R may be generated and the random number R and the PID may be sent to the communication terminal 10 at step S3. In this case, the communication terminal 10 can omit transmitting the acknowledge signal ACK at step S6. These modifications can apply to the other embodiments of the present invention.

Figure 3:
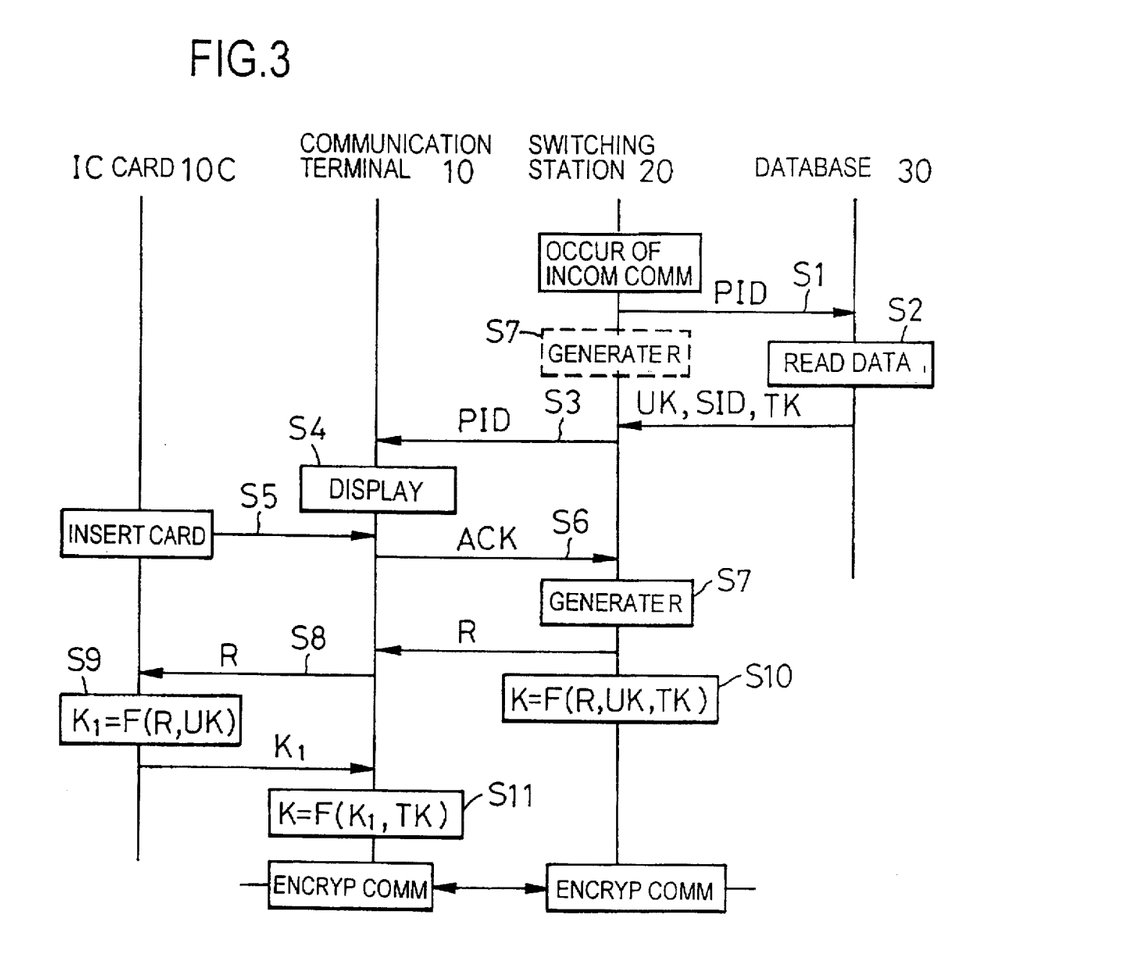
FIG. 3 is a schematic diagram showing a cryptical control sequence of an incoming communication according to the second aspect of the present invention.

In the second aspect of the present invention, so as to further improve the cryptical reliability of the communication information of the first aspect, a cryptical key is generated corresponding to both the user-intrinsic information UK and the terminal-intrinsic information TK. FIG. 3 is a schematic diagram showing a cryptical control sequence according to the second aspect of the present invention. The cryptical control sequence according to the second aspect of the present invention is the same as that according to the first aspect of the present invention except for the following points. In FIG. 3, at step S1, the database 30 receives an incoming communication PID from the switching station 20. At step S2, corresponding intrinsic information UK and an incoming-communication registered terminal identification number SID are read from the subscriber memory 33. In addition, intrinsic information TK corresponding to the identification number SID is read from the terminal data memory 32. The intrinsic information TK is sent to the switching station 20 along with the UK and SID. The communication terminal 10 reads a "key K1=F (R, UK)" (at step S9) from the IC card 10C and the terminal-intrinsic information TK from the terminal information memory 15. At step 11, the key generating portion 12 performs an operation "cryptical key K=F (K1, TK) corresponding to the terminal-intrinsic information TK and sends the key to the encryption executing portion 13. On the other hand, at step S10, the switching station 20 performs an operation "cryptical key K=F (R, UK, TK)=F ($K_1$, TK)" where $K_1$=F (R, UK) and sends the key to the encryption executing portion 23. Since the other control steps of the second aspect are the same as those of the first aspect shown in FIG. 2, their description is omitted.

Figure 4:
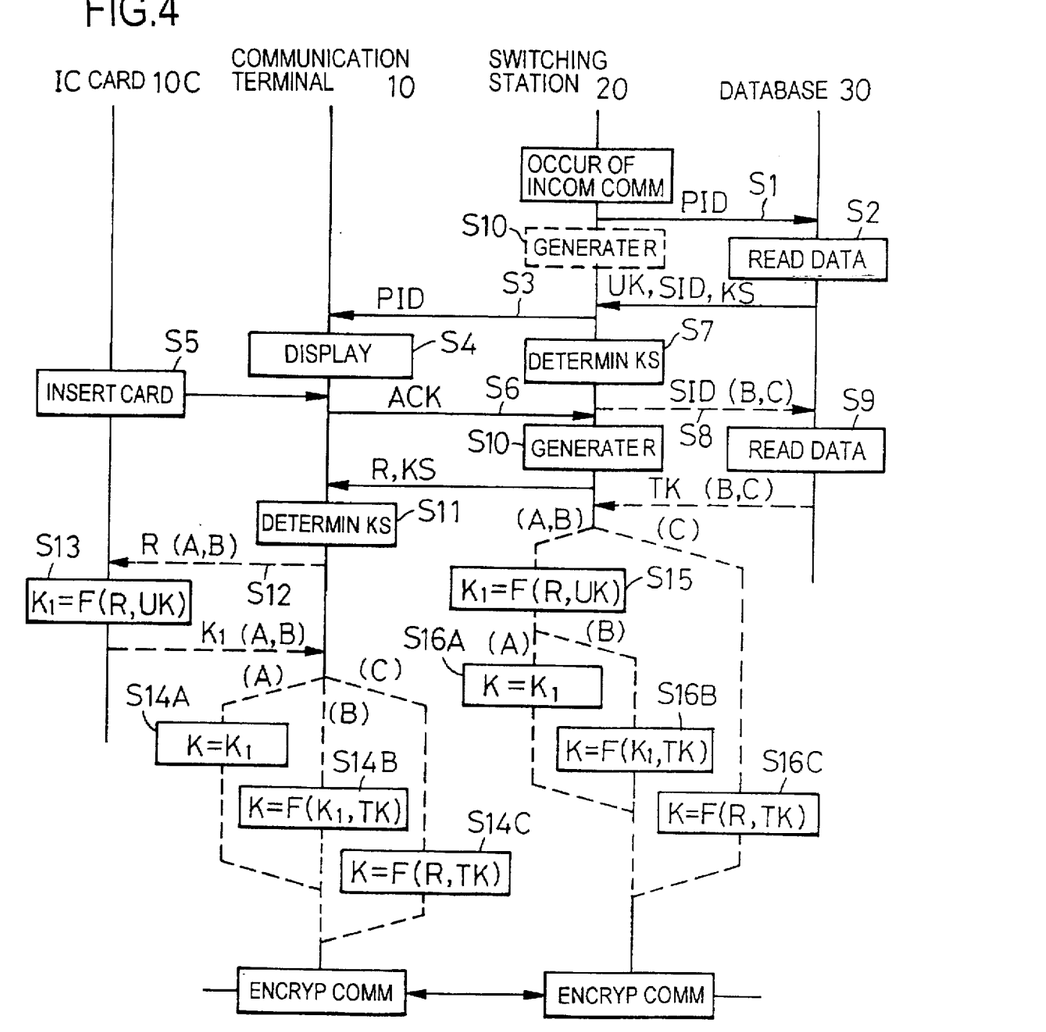
FIG. 4 is a schematic diagram showing a cryptical control sequence of an incoming communication according to the third aspect of the present invention.
Figure 4A:
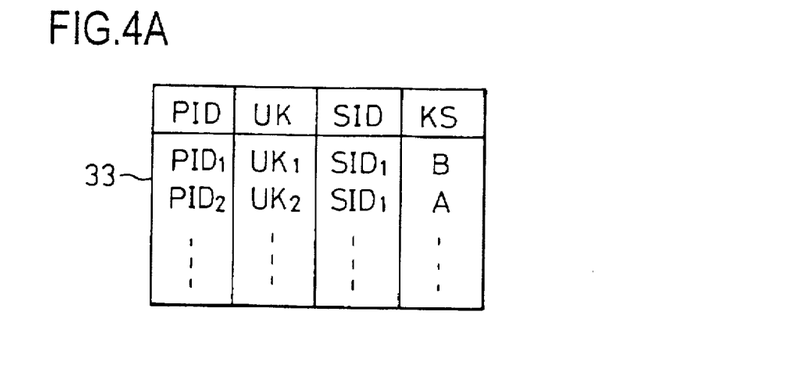
FIG. 4A is a table showing the construction of a subscriber data memory 33 of FIG. 4.

According to the third aspect of the present invention, the cryptical key generating method is selected from the methods according to the first and second aspects (these methods are referred to as method A and method B) and a method for generating a cryptical key corresponding to the terminal-intrinsic information TK (this method is referred to as method C). In the embodiment according to the third aspect of the present invention, as shown in FIG. 4A, the subscriber data memory 33 stores key selection information K for selecting one of the key generating methods A, B, and C. FIG. 4 shows a control sequence according to the third aspect of the present invention. In FIG. 4, the process flow relating to one or two of the key generating methods A, B, and C is denoted by dashed lines and the method(s) are denoted by A, B, and C in brackets.

When an incoming communication with a communication number PID takes place in the switching station 20, at step S1, the control portion 21 sends the communication number PID to the database 30 and requests corresponding user information therefrom. At step S2, the database 30 reads intrinsic information UK, an incoming-communication registered terminal identification number SID, and key selection information KS corresponding to the PID from the subscriber data memory 33 and sends them to the switching station 20. At step S3, the control portion 21 of the switching station 20 sends the incoming communication number PID to the terminal 10 corresponding to the terminal identification number SID. At step S4, the control portion 11 of the terminal 10 displays the PID or the corresponding user name on the display portion 18. At step S5, the user 40 inserts his (her) IC card 10C into the card reader 17. At step S6, the control portion 11 sends the acknowledge signal ACK to the switching station 20. On the other hand, at step S7 the control portion 21 of the switching station determines whether the key selection information KS is A, B, or C. When the key selection information KS is B or C, at step S8 the control portion 21 sends the terminal identification number SID to the database 30 and requests the terminal-intrinsic information therefrom. At step S9, the data base 30 reads the terminal-intrinsic information TK corresponding to the SID from the terminal data memory 32 and sends the terminal-intrinsic information TK to the switching station 20.

At step 6, the control portion 21 of the switching station receives the acknowledge signal ACK. At step 10, the control portion 21 generates a random number R corresponding to the acknowledge signal ACK. The control portion 21 sends the random number R along with the key selection information KS received from the database 30 to the terminal 10. At step S11, the control portion 11 of the terminal determines the received key selection information KS. When the key selection information KS is A or B, at step S12 the control portion 11 of the terminal sends the random number R to the IC card 10C. At step S13, the control portion 11C of the IC card causes the key generating portion 12C to generate a key K1=F (R, UK) corresponding to the received random number R and the user-intrinsic information UK read from the user information memory 19C and sends the key to the terminal control portion 11. At step S14A, S14B, or S14C, when the key selection information KS is A, B, or C, the control portion 11 generates a cryptical key K. In other words, when KS=A, at step S14A the cryptical key K1=F (R, UK) corresponding to the user information UK received from the IC card 10C is sent to the encryption executing portion 13 as a cryptical key K. When KS=B, at step S14B the key generating portion 12 generates a cryptical key K=F ($K_1$, TK) corresponding to the cryptical key $K_1$ generated by using the user information UK received from the IC card 10C and the terminal-intrinsic information TK read from the terminal information memory 15 and sends the cryptical key to the encryption executing portion 13. When KS=C, at step S14C the key generating portion 12 generates a cryptical key K=F (R, TK) corresponding to the terminal-intrinsic information TK read from the terminal information memory 15 and the random number R and sends the cryptical key to the encryption executing portion 13.

In the switching station 20, when the key selection information KS is A or B, at step S15 the key generating portion 22 generates a cryptical key $K_1$=F (R, UK) corresponding to the user-intrinsic information UK and the random number R. In addition, depending on whether the key selection information KS is A, B, or C, at step S16A, S16B, or S16C the key generating portion 22 generates a cryptical key K=$K_1$, K=F ($K_1$, TK) or K=F (R, TK) and sends the generated key to the encryption executing portion 23 as with step S14A, S14B, or S14C, respectively.

Thereafter, the encryption executing portions 13 and 23 encrypt communication information to be transmitted between the communication terminal 10 and the switching station 20 and decrypts received communication information. In the embodiment shown in FIG. 4, when A, B, and C, which are the key selection information KS stored in the subscriber data memory 33, are periodically changed in the database 30 for each subscriber or by each subscriber, the cryptical reliability can be further improved. In this embodiment, as shown by a box S7 (dashed line), just after an incoming communication is detected, a random number R may be generated. At step S3 the communication number PID may be sent along with the random number R and the key selection information KS to the communication terminal 10. In this case, the sending of the acknowledge signal ACK at step S6 can be omitted. Alternatively, when the database 30 sends the UK, SID, and KS to the switching station 20 at step S2, it may determine the key selection information KS. When the key selection information KS is B or C, it reads terminal-intrinsic information TK corresponding to the terminal identification number SID from the memory 32 and sends them to the switching station 20. In this case, steps S8 and S9 are omitted.

Figure 5:
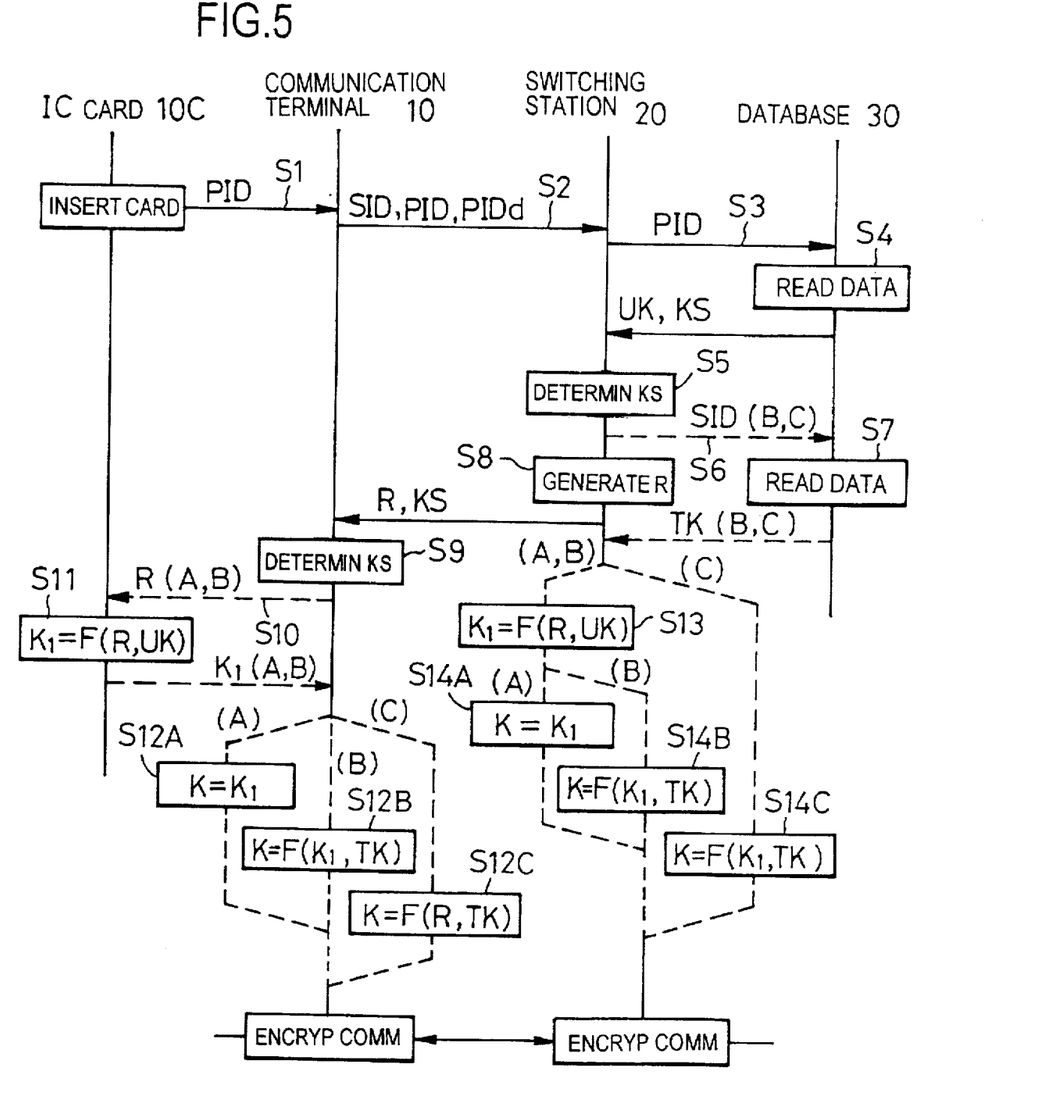
FIG. 5 is a schematic diagram showing a cryptical control sequence of an outgoing communication according to the third aspect of the present invention.

In the embodiments shown in FIGS. 2, 3, and 4, an incoming communication to the user 40 was described. However, the embodiments according to the first, second, and third aspects of the present invention can be applied for encrypting communication information transmitted between the communication terminal 10 and the switching station 20 in the case that the user sends communication information when the user initiate an outgoing communication. FIG. 5 shows a cryptical control sequence of an outgoing communication according to the third aspect of the present invention. In this case, it is assumed that the user 40 uses the IC card 10C.

At step S1 the user 40 inserts the IC card 10C into the card reader 17 of the terminal 10. Thereafter, the user 40 inputs a communication number PIDd of a receiving subscriber from the ten-key input portion 16. At step S2 the communication terminal 10 sends a communication number (namely, a sender number) PID of the user 40 read from the user information memory 19C of the IC card 10C, the terminal identification number SID read from the terminal information memory of the communication terminal 10, and the incoming communication number PIDd to the switching station 20. At step S3 the control portion 21 of the switching station 20 sends the received sender communication number PID to the database 30 and requests the information of the user therefrom. At step S4 the database 30 reads the intrinsic information UK and the key selection information KS corresponding to the PID from the subscriber data memory 33 and sends them to the switching station 20. At step S5 the control portion 21 of the switching station 20 determines the received key selection information KS. The control portion 21 selects a key generating method corresponding to only the user-intrinsic information UK and the random number R, corresponding to both the user-intrinsic information UK and the terminal-intrinsic information TK plus the random number R, or corresponding to only the terminal-intrinsic information TK and the random number R depending on whether the key selection information KS is A, B, or C, respectively. When the key selection information KS is B or C, at step S6 the switching station 20 sends the terminal identification number SID to the database 30 and requests the terminal-intrinsic information therefrom. At step S7 the database 30 reads the terminal-intrinsic information TK corresponding to the SID from the terminal data memory 32 and sends the terminal-intrinsic information TK to the switching station 20. At step S8 the switching station 20 generates the random number R regardless of whether the selection information KS is A, B, or C and sends it along with the key selection information KS to the communication terminal 10. Since steps S9 to S14 in FIG. 5 are the same as steps S11 to S16C, their description is omitted.

In the FIG. 5 embodiment, as with the embodiment shown in FIG. 4, when the key selection information KS read at step S2 is B or C, the database 30 may read the intrinsic information TK corresponding to the terminal identification number SID from the memory 32 and send it along with the UK and KS to the switching station 20. When the sequence shown in FIG. 5 is applied to the outgoing communication control sequence of the user according to the first and second aspects of the present invention, the sequences corresponding to A or B can be executed. Thus, their description is omitted. In the embodiments shown in FIGS. 4 and 5, the case that one of three key generating methods is selected was described. However, it is clear that any two of the three key generating methods are predetermined key generating method and one of them can be selected corresponding to the key selection information KS.

As described above, according to the present invention, when communication information that is transmitted between the communication terminal and the switching station in a communication network that accomplishes personal communication is encrypted, even if the communication terminal is the same, since the information used for generating a cryptical key depends on the user, the cryptical reliability can be improved.

We claim:

1. A personal communication cryptical control method for causing a communication terminal and a switching station with a terminal identification number SID and corresponding terminal-intrinsic information TK to generate the same cryptical key, for encrypting communication information transmitted therebetween corresponding to the cryptical key, and for storing user-intrinsic information UK corresponding to each user communication number PID in a database, the method comprising the steps of:

(a) retrieving the user-intrinsic information UK corresponding to the user communication number PID from the database;

(b) generating a random number R;

(c) generating a cryptical key K corresponding to at least the random number R and the user-intrinsic information K;

(d) encrypting the communication information to be transmitted to the communication terminal corresponding to the cryptical key K and decrypting the encrypted communication information received form the communication terminal;

(e) receiving the random number R from the switching station;

(f) generating a cryptical key K corresponding to at least the user-intrinsic information UK and the random number R that is input to the communication terminal; and (g) encrypting the communication information to be transmitted to the switching station corresponding to the cryptical key and decrypting the encrypted communication information received from the switching station, wherein said steps (a) to (d) are performed by the switching station; and wherein said steps (e) to (g) are performed by the communication terminal.

2. The method as set forth in claim 1, wherein the database is adapted for storing the terminal-intrinsic information TK corresponding to the communication terminal, wherein said step (a) is performed by reading the intrinsic information TK corresponding to the communication terminal and the user-intrinsic information UK from the database, wherein said step (c) is performed by generating the cryptical key R corresponding to the random number R, the user-intrinsic information UK, and the terminal-intrinsic information TK, and wherein said step (f) is performed by generating the cryptical key K corresponding to the random number R, the user-intrinsic information UK, and the terminal-intrinsic information TK.

3. A personal communication cryptical control method for causing a communication terminal and a switching station with a terminal identification number SID and a corresponding terminal-intrinsic information TK to generate the same cryptical key, for encrypting communication information transmitted therebetween, for storing user-intrinsic information UK and key selection information KS corresponding to each user communication number PID and the terminal-intrinsic information TK corresponding to the terminal identification number SID in a database, the key selection information KS representing a selection of one of a plurality of methods for generating a cryptical key K corresponding to either or both the user-intrinsic information UK and the terminal-intrinsic information TK plus a random number R, the method comprising the steps of:

(a) retrieving the user intrinsic information UK corresponding to the user communication number PID and the key selection information KS from the database;

(b) generating a random number R;

(c) determining one of the key generating methods corresponding to the key selection information KS and generating the cryptical key K corresponding to the determined key generating method;

(d) sending the random number R and the key selection information KS to the communication terminal;

(e) encrypting the communication information to be transmitted to the communication terminal corresponding to the cryptical key K and decrypting the encrypted communication information received from the communication terminal;

(f) receiving the random number R and the key selection information KS from the switching station;

(g) determining one of the key generating method corresponding to the key selection information KS and generating the cryptical key K corresponding to the determined key generating method; and (h) encrypting the communication information to be transmitted to the switching station corresponding to the cryptical key K and decrypting the encrypted communication information received from the switching station;

wherein said steps (a) to (d) are performed by the switching station; and wherein said steps (e) to (g) are performed by the communication terminal.

4. The method as set forth in claim 3, wherein the cryptical key generating methods each include a method for generating the cryptical key corresponding to the user-intrinsic information UK and the random number R and another method for generating the cryptical key corresponding to the user-intrinsic information UK, the terminal-intrinsic information TK, and the random number R.

5. The method as set forth in claim 3, wherein the cryptical key generating methods each include a method for generating the cryptical key corresponding to the user-intrinsic information UK and the random number R and another method for generating the cryptical key corresponding to the terminal-intrinsic information TK and the random number R.

6. The method as set forth in claim 5, wherein the cryptical key generating methods each include a method for generating the cryptical key corresponding to the user-intrinsic information UK, the terminal-intrinsic information TK, and the random number R.

7. The method as set forth in claim 1, 2, or 3, wherein said cryptical key K generating step of the communication terminal includes generating the cryptical key K in an IC card inserted into the communication terminal corresponding to the random number R received to the IC card and the user-intrinsic information UK stored in the IC card.

8. The method as set forth in claim 1, 2, or 3, wherein said cryptical key K generating step of the communication terminal includes:

generating a primary key $K_1$ in an IC card inserted into the communication terminal corresponding to the random number R received to the IC card and the user-intrinsic information UK stored in the IC card;

outputting the primary key $K_1$ to the communication terminal; and generating the cryptical key K in the communication terminal corresponding to the primary key $K_1$ and the terminal-intrinsic information TK stored in the communication terminal.

9. The method as set forth in claim 1, 2, or 3, wherein said cryptical key K generating step includes reading the user-intrinsic information UK stored in a magnetic card inserted into the communication terminal.

* * * * *